US012257494B2

(12) United States Patent
Shionozaki

(10) Patent No.: US 12,257,494 B2
(45) Date of Patent: Mar. 25, 2025

(54) INFORMATION PROCESSING SYSTEM AND INFORMATION PROCESSING METHOD

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 17/222,304

(22) Filed: Apr. 5, 2021

(65) Prior Publication Data

US 2021/0220726 A1  Jul. 22, 2021

Related U.S. Application Data

(62) Division of application No. 16/461,857, filed as application No. PCT/JP2017/045621 on Dec. 20, 2017, now Pat. No. 11,413,519.

(30) Foreign Application Priority Data

Feb. 20, 2017  (JP) .................................. 2017-028774

(51) Int. Cl.
*A63F 13/21* (2014.01)
*A63F 13/45* (2014.01)
*A63F 13/79* (2014.01)

(52) U.S. Cl.
CPC .............. *A63F 13/21* (2014.09); *A63F 13/45* (2014.09); *A63F 13/79* (2014.09); *A63F 2250/02* (2013.01); *A63F 2250/26* (2013.01)

(58) Field of Classification Search
CPC .......... A63F 13/21; A63F 13/45; A63F 13/79; A63F 2250/02; A63F 2250/26

(Continued)

(56) References Cited

U.S. PATENT DOCUMENTS 9,220,985 B1   12/2015  Auterio et al.
9,669,297 B1   6/2017   Delaet
(Continued)

FOREIGN PATENT DOCUMENTS

EP  3246870 A1    11/2017
JP  H08191955 A   7/1996
(Continued)

OTHER PUBLICATIONS

International Search Report issued on Mar. 20, 2018 in PCT/JP2017/045621 filed on Dec. 20, 2017.

(Continued)

*Primary Examiner* — Ryan Hsu
(74) *Attorney, Agent, or Firm* — Oblon, McClelland, Maier & Neustadt, L.L.P.

(57) ABSTRACT

An information processing method is disclosed. In one embodiment, a game space of a positional information game is controlled, a plurality of user terminals executing the positional information game to access the game space based on locations of the user terminals in a real space. Information of human activities regarding regions in the real space is obtained, the regions including at least a first region and a second region neighboring the first region. Whether the first region is unsafe is determined based on the obtained information of human activities. Responsive to the first region being determined as unsafe, a game content accessible at a virtual location in the game space that is associated with the second region is recognized, and the game users are notified of presence of the game content in the virtual location in the game space that is associated with the second region.

15 Claims, 10 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2006/0224046 | A1 | 10/2006 | Ramadas |
| 2007/0149282 | A1 | 6/2007 | Lu |
| 2008/0076579 | A1 | 3/2008 | Tabata |
| 2008/0297515 | A1 | 12/2008 | Bliss |
| 2011/0102459 | A1 | 5/2011 | Hall |
| 2012/0242486 | A1* | 9/2012 | Witkemper ........ G01C 21/3423 340/573.4 |
| 2013/0095914 | A1 | 4/2013 | Allen |
| 2014/0038719 | A1* | 2/2014 | Kobayashi .............. A63F 13/69 463/40 |
| 2015/0271633 | A1 | 9/2015 | Yamane |
| 2016/0114247 | A1 | 4/2016 | Biswas et al. |
| 2016/0317099 | A1 | 11/2016 | Kawai et al. |
| 2017/0003784 | A1* | 1/2017 | Garg ........................ A63F 13/87 |
| 2017/0032191 | A1 | 2/2017 | Ackland |

FOREIGN PATENT DOCUMENTS

| | | |
|---|---|---|
| JP | H11327753 A | 11/1999 |
| JP | 2001145785 A | 5/2001 |
| JP | 2002-56293 A | 2/2002 |
| JP | 2004-209213 A | 7/2004 |
| JP | 2008-23367 A | 2/2008 |
| JP | 2008-73265 A | 4/2008 |
| JP | 2011206220 A | 10/2011 |
| JP | 2012-16539 A | 1/2012 |
| JP | 2012235887 A | 12/2012 |
| JP | 2013017587 A | 1/2013 |
| JP | 2013-59573 A | 4/2013 |
| JP | 2014-144349 A | 8/2014 |
| JP | 2014186504 A | 10/2014 |
| JP | 2015-169702 A | 9/2015 |
| JP | 2015-181538 A | 10/2015 |
| KR | 20150042886 A | 4/2015 |
| WO | WO-2015162949 A | 10/2015 |
| WO | WO 2016/021235 A1 | 2/2016 |
| WO | WO 2016/113968 A1 | 7/2016 |

OTHER PUBLICATIONS

Nishiyama, N., "Game Reads Emotion from Expression of User! Target to Be Monitored during Game?", Mar. 2016, Internet. URL:http://www.keyman.or.jp/at/30006399/, 6 pages, with unedited-computer generated English translation.

The Free Dictionary by Farlex, Human Action, retrieved from Internet URL https://www.thefreedictionary.com/human+action, on Feb. 24, 2021. (Year 2021).

English translation of Notice of Reasons for Refusal issued Nov. 30, 2021 in Japanese Patent Application No. 2018-568017, 5 pages.

* cited by examiner

INFORMATION PROCESSING SYSTEM AND INFORMATION PROCESSING METHOD

CROSS-REFERENCE TO RELATED APPLICATION

This application is a divisional of U.S. Ser. No. 16/461,857 filed May 17, 2019, which is a National Phase Patent Application and claims the priority of International Application Number PCT/JP2017/045621, filed on Dec. 20, 2017, which claims priority to Japanese Application No. JP 2017-028774, filed Feb. 20, 2017. The disclosure of U.S. Ser. No. 16/461,857 is hereby incorporated by reference in its entirety.

TECHNICAL FIELD

The present disclosure relates to an information processing system and an information processing method.

BACKGROUND ART

Conventionally, there are positional information games that are performed on the basis of positional information acquired by communication terminals that users carry.

For example, Patent Literature 1 proposes a system that can virtually place a virtual object such as a treasure box, which is used in a game, at a virtual placement location associated with a real space at a certain location, to which the system has been brought, in the real world, set prescribed conditions related to the object, and register setting information as setting data in a game server.

In addition, Patent Literature 2 proposes a system that provides prior explanation information about what will happen to a user in the near future to a terminal, further unilaterally delivers instruction information using a talking function of the terminal, and then starts counting down of a time limit, thereby strongly motivating the user to move on an action.

In addition, Patent Literature 3 proposes a game control apparatus that provides a privilege of a game to a user if it is determined that the user who has won a lottery and an associated user's terminal are present in a predetermined region in an event period.

In addition, Patent Literature 4 proposes a game system that allows display of advertisements by causing a character to perform an action in response to a user's operation at a specific location in order to allow the user to develop the character.

CITATION LIST

Patent Literature

Patent Literature 1: JP 2013-59573A
Patent Literature 2: JP 2004-209213A
Patent Literature 3: JP 2014-144349A
Patent Literature 4: JP 2002-56293A

DISCLOSURE OF INVENTION

Technical Problem

However, although the conventional positional information game systems associate items and content with specific locations in a real space to enable acquisition thereof in a game space, feelings of persons who are present at the specific locations in the real space are not especially taken into consideration in relation to arrangement of the items and the content.

Thus, the present disclosure proposes an information processing system and an information processing method capable of controlling content that is to be provided in association with a location in consideration of feelings of persons who are present at the location.

Solution to Problem

According to the present disclosure, there is proposed an information processing system including: a communication unit that receives at least information related to a feeling of a user who is present in a predetermined region; and a control unit that controls content that is associated with the predetermined region and is to be provided to the user, on the basis of the feeling of the user who is present in the predetermined region, which is specified on the basis of the information received by the communication unit.

According to the present disclosure, there is proposed an information processing system including: a communication unit that receives at least information related to feelings of users who are present in a predetermined region; a storage unit that accumulates the feelings of the users in units of the users; and a control unit that performs control to extract the feelings of the users who are present in the predetermined region from the storage unit and send a reply to a content providing server via the communication unit when request information of requesting the feelings of the users who are present in the predetermined region from the content providing server is received via the communication unit. The content providing server controls content that is associated with the predetermined region and is to be provided to the users, on the basis of the feelings of the users who are present in the predetermined region.

According to the present disclosure, there is proposed an information processing method including, by a processor: receiving, by a communication unit, at least information related to a feeling of a user who is present in a predetermined region from a communication unit; and controlling content that is associated with the predetermined region and is to be provided to the user, on the basis of the feeling of the user who is present in the predetermined region, which is specified on the basis of the information received by the communication unit.

According to the present disclosure, there is proposed an information processing method including, by a processor: receiving, by a communication unit, at least information related to feelings of users who are present in a predetermined region; accumulating, in a storage unit, the feelings of the users in units of the users; and performing control to extract the feelings of the users who are present in the predetermined region from the storage unit and send a reply to a content providing server via the communication unit when request information of requesting the feelings of the users who are present in the predetermined region from the content providing server is received via the communication unit. The content providing server controls content that is associated with the predetermined region and is to be provided to the users, on the basis of the feelings of the users who are present in the predetermined region.

Advantageous Effects of Invention

According to the embodiments of the present disclosure, it is possible to control content that is to be provided in association with a location in consideration of feelings of persons who are present at the location as described above.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
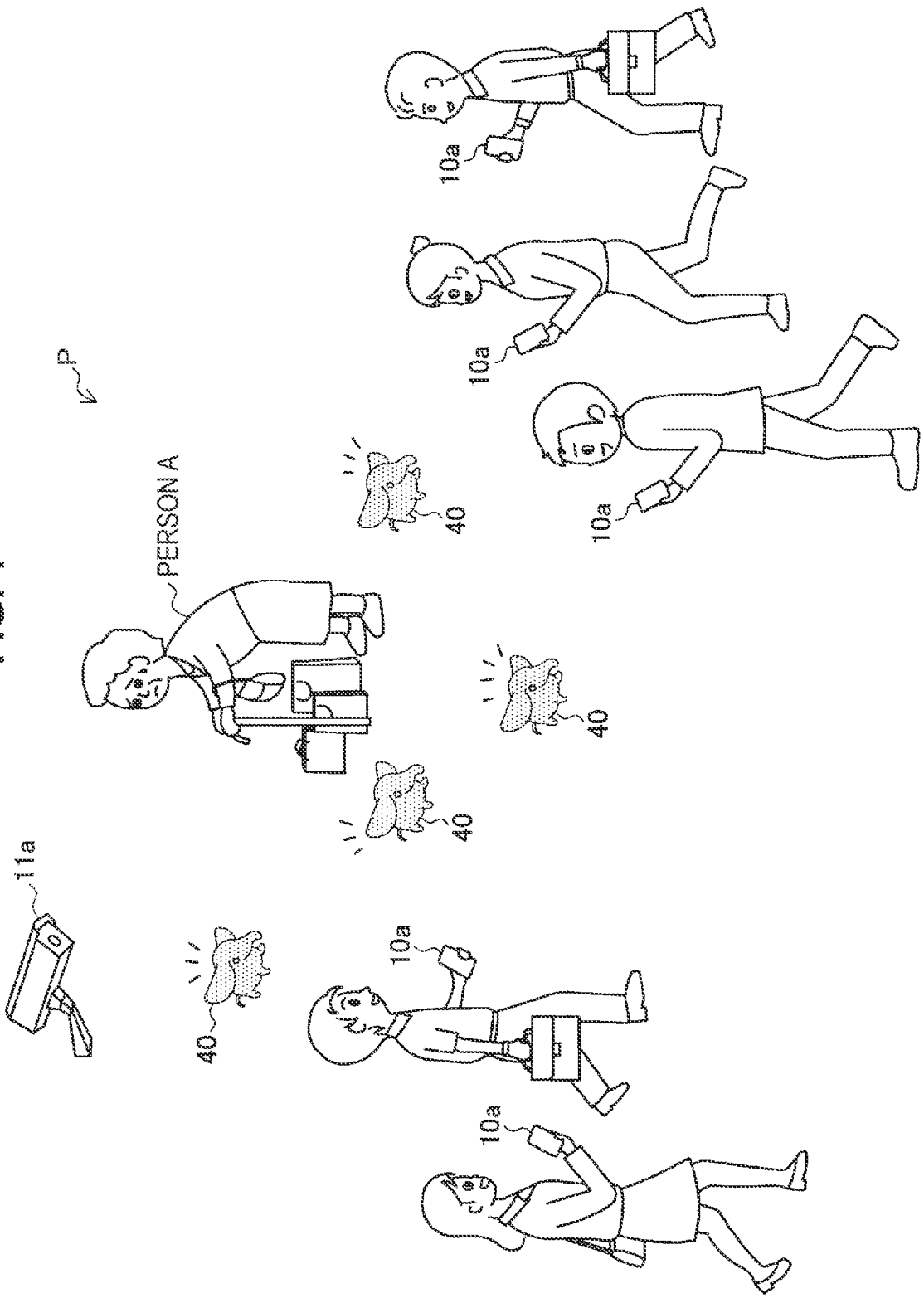
FIG. 1 is a diagram for explaining an outline of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.

1. Outline of information processing system according to one embodiment of present disclosure
2. Configuration
2-1. Configuration of feeling management server 2
2-2. Configuration of game server 3
3. Examples
3-1. First example
3-2. Second example
3-3. Third example
3-4. Fourth example
3-5. Fifth example
4. Conclusion 1. Outline of Information Processing System According to One Embodiment of Present Disclosure FIG. 1 is a diagram for explaining an outline of an information processing system according to an embodiment of the present disclosure. As illustrated in FIG. 1, the information processing system according to the embodiment can estimate and recognize a feeling of a person A who is present at a predetermined location P on the basis of an image captured by a camera 11a and sensing data detected by a wearable device (not illustrated) that the person A owns and control content of a game to gather game users at the predetermined location P or to allow the game users to step away from the predetermined location P in conjunction with a positional information game system.

In a case in which the person A who is present at the predetermined location P is in trouble as illustrated in FIG. 1, for example, it is possible to call neighboring game users and increase motivation to help the person in trouble by causing an item 40 to appear in association with the location P.

In addition, in a case in which a game user who is present at a certain location is composed, not happy, and not excited, it is possible to allow the game user to enjoy the game by causing a special item to appear at the location.

Figure 2:
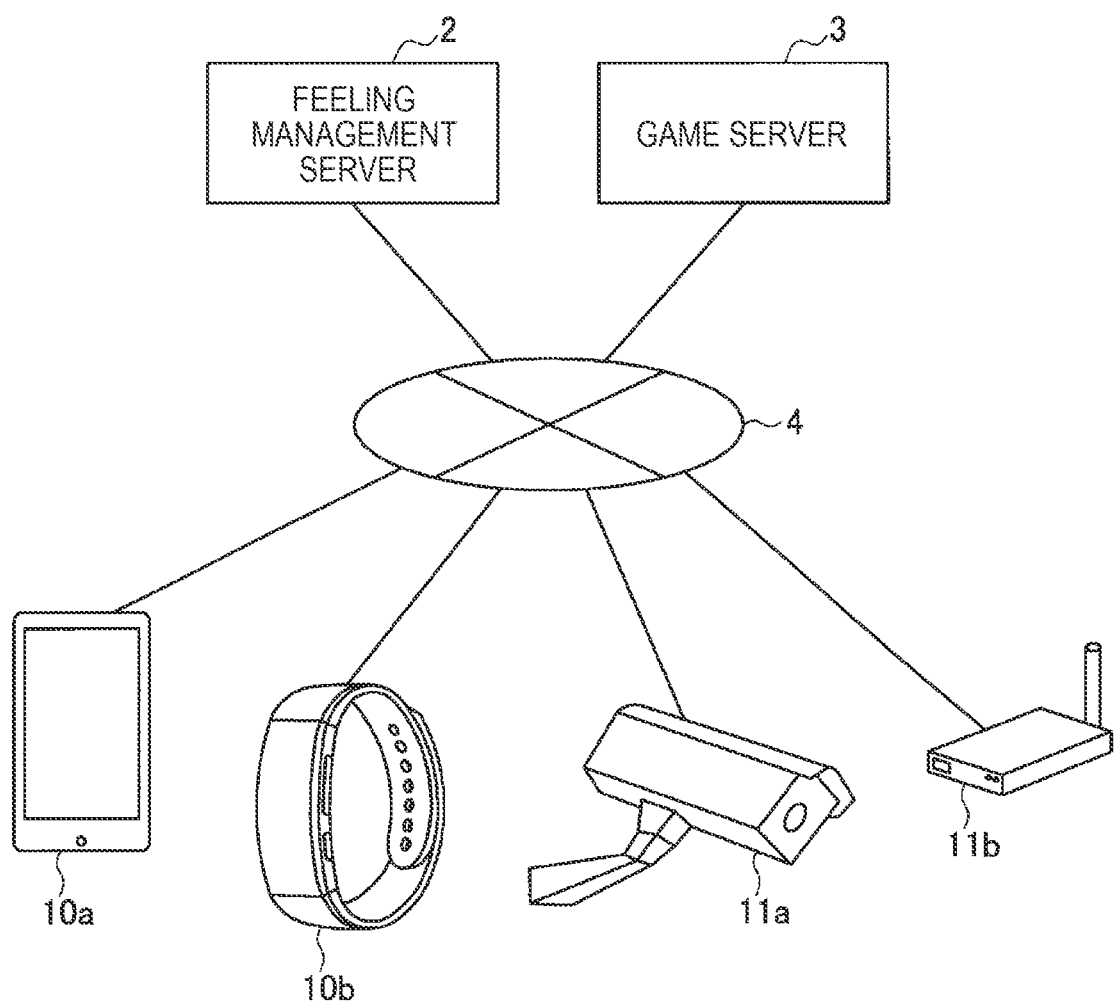
FIG. 2 is a diagram illustrating an example of an overall configuration of the information processing system according to the embodiment.

An overall configuration of the information processing system according to such an embodiment will be described with reference to FIG. 2. FIG. 2 is a diagram illustrating an example of the overall configuration of the information processing system according to the embodiment.

As illustrated in FIG. 2, the information processing system according to the embodiment includes a user terminal device 10a, a wearable device 10b, a camera 11a, a people stream sensor 11b, a feeling management server 2, and a game server 3.

The feeling management server 2 estimates and accumulates feelings of users who are present in a predetermined region. Specifically, the feeling management server 2 can estimate in real time the feelings of the users by receiving current positions of the users and sensing data from the user terminal device 10a such as a smartphone, a mobile phone terminal, or a tablet terminal and the wearable device 10b such as a smart band, smart eyeglasses, or a smart watch that the users are wearing and performs behavior recognition, display recognition, or the like from the sensing data, for example. Also, a result of performing estimation to some extent after performing the behavior recognition, the display recognition, or the like on the side of the user terminal device 10a and the wearable device 10b may be transmitted to the feeling management server 2.

Alternatively, the feeling management server 2 can also acquire human motion, a degree to which people remain, the number of humans, a degree of activity, face expressions, sounds (environmental sounds, utterance sounds), and the like on the basis of detection data from the camera 11a and the people stream sensor 11b as the feelings of the users who are present in the predetermined region. The people stream sensor 11b can recognize the number of communication terminals that are present at the location and obtain staying periods (so called remaining) of the respective devices by receiving radio waves emitted from the communication terminals that surrounding persons own through Wi-Fi (registered trademark), Bluetooth (registered trademark), or the like and aggregating the detected information. There are also cases in which IDs can be obtained from the radio waves emitted from the communication terminals, and in such cases, it is possible to more accurately recognize how long the persons remain and a people stream.

The game server 3 (one example of the content providing server) performs control to cooperate with a game application that is being operated on the client terminals (the user terminal device 10a and the wearable device 10b) of the respective users and provide game screens, game sounds, and the like to the client terminals of the respective users. In addition, the game server 3 acquires real-time feelings of persons who are present in a predetermined region from the feeling management server 2 and controls appearance of game content (game items, game events, and the like) associated with the location in accordance with the feelings of the persons.

The information processing system according to the embodiment of the present disclosure has been described above. Next, specific configurations of the respective devices that are included in the information processing system according to the embodiment will be described with reference to the drawings.

2. Configuration 2-1. Configuration of Feeling Management Server 2

Figure 3:
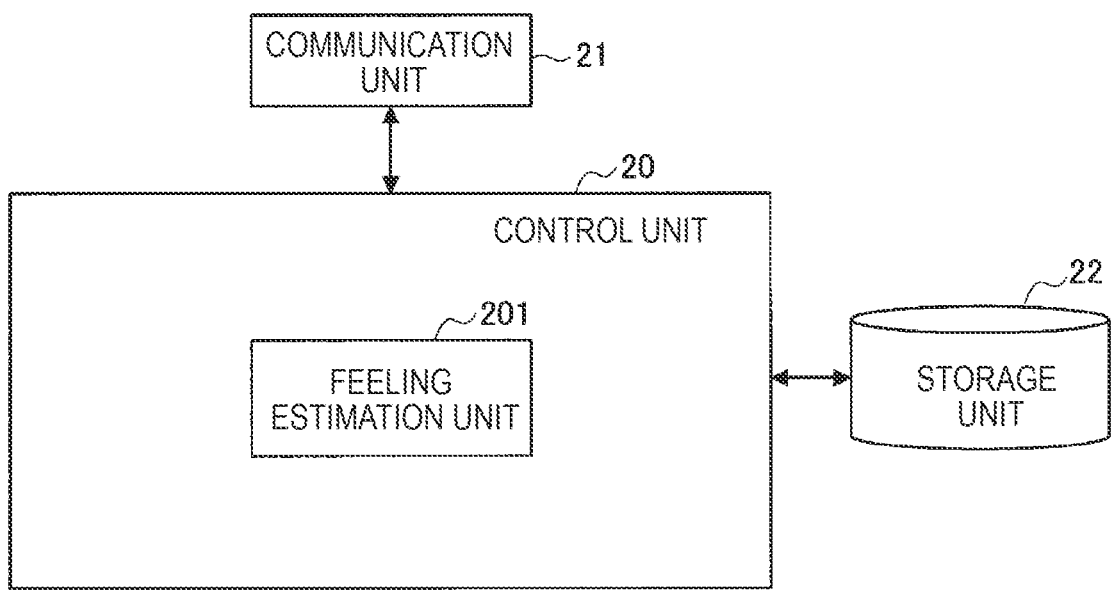
FIG. 3 is a block diagram illustrating an example of a configuration of a feeling management server according to the embodiment.

FIG. 3 is a block diagram illustrating an example of a configuration of the feeling management server 2 according to the embodiment. As illustrated in FIG. 3, the feeling management server 2 has a control unit 20, a communication unit 21, and a storage unit 22.

The control unit 20 functions as a computation processing device and a control device and controls overall operations of the feeling management server 2 in accordance with various programs. The control unit 20 is realized by electronic circuits such as a central processing unit (CPU) and a microprocessor, for example. In addition, the control unit 20 may include a read only memory (ROM) that stores programs, computation parameters, and the like that are used and a random access memory (RAM) that temporarily stores parameters and the like that appropriately change.

The control unit 20 according to the embodiment also functions as a feeling estimation unit 201. The feeling estimation unit 201 estimates feelings of users on the basis of information (sensing data) related to the feelings of the users in the predetermined region, which is received from the user terminal device 10a, the wearable device 10b, the camera 11a, the people stream sensor 11b, and the like. For example, the feeling estimation unit 201 may recognize behaviors of the users and estimate the feelings from behavior recognition results on the basis of acceleration sensor data, gyro sensor data, geomagnetic sensor data, positional information, vibration sensor data, and the like received from the user terminal device 10a and the wearable device 10b. In addition, the feeling estimation unit 201 may analyze sound data received from the user terminal device 10a and the wearable device 10b and estimate the feelings. In addition, the feeling estimation unit 201 may estimate the feelings on the basis of face expression analysis of face images and biological information (pulses, heart rates, amounts of sweating, aspiration, body temperatures, myoelectric values, brain waves, and the like) analysis received from the user terminal device 10a and the wearable device 10b. In addition, the feeling estimation unit 201 can also estimate the feelings of the persons (individuals may not be able to be specified) in the predetermined region on the basis of a people stream, the lengths of time they remain, the number of persons, face expressions, sound data (environment sounds, utterance sounds), and the like in a predetermined region, which are received from the camera 11a and the people stream sensor 11b. In addition, the feeling estimation unit 201 associates and stores the estimation results with the location, the users, dates and times, and the like in the storage unit 22. In addition, the feeling estimation unit 201 can acquire information of the game users (identifiers, positional information, or the statistical number of users who are playing the game in a certain region) from the game server 3, and estimate feelings of the game users in a predetermined region, or estimate feeling of persons other than the game users.

The communication unit 21 connects to a network 4 in a wired or wireless manner and transmits and receives data to and from an external device via the network 4. The communication unit 21 establishes communication connection with the network 4 through a wired/wireless local area network (LAN) or Wireless Fidelity (Wi-Fi) (registered trademark), for example.

In addition, the communication unit 21 according to the embodiment receives information related to the feelings of the users in the predetermined region from the user terminal device 10a, the wearable device 10b, the camera 11a, the people stream sensor 11b, and the like. In addition, the communication unit 21 transmits estimation results of the feelings of (one or more) persons who are present in the predetermined region to the game server 3 in response to a request from the game server 3.

The storage unit 22 is realized by a read only memory (ROM) that stores programs, computation parameters, and the like that are used for processing performed by the control unit 20 and a random access memory (RAM) that temporarily stores parameters and the like that appropriately change.

In addition, the storage unit 22 according to the embodiment accumulates feeling information estimated by the feeling estimation unit 201 along with dates and times for each location and for each user.

The configuration of the feeling management server 2 according to the embodiment has been specifically described above.

2-2. Configuration of Game Server 3

Figure 4:
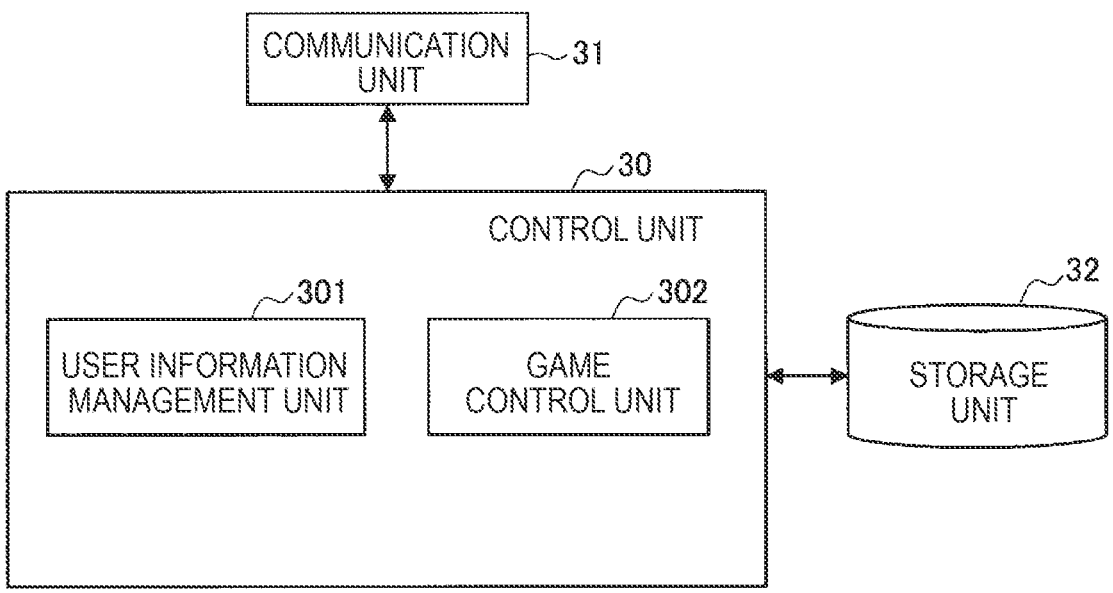
FIG. 4 is a block diagram illustrating an example of a configuration of a game server according to the embodiment.

FIG. 4 is a block diagram illustrating an example of a configuration of the game server 3 according to the embodiment. As illustrated in FIG. 4, the game server 3 has a control unit 30, a communication unit 31, and a storage unit 32.

(Control Unit 30)

The control unit 30 functions as a computation processing device and a control device and controls overall operations in the game server 3 in accordance with various programs. The control unit 30 is realized by electronic circuits such as a central processing unit (CPU) and a microprocessor, for example. In addition, the control unit 30 may include a read only memory (ROM) that stores programs, computation parameters, and the like that are used and a random access memory (RAM) that temporarily stores parameters and the like that appropriately change.

The control unit 30 according to the embodiment also functions as a user information management unit 301 and a game control unit 302.

The user information management unit 301 registers information (identification information, game parameters of the individuals, and the like) of the game users in the storage unit 32 and manages the information.

The game control unit 302 controls the game provided to the users in cooperation with game applications that are operated on client terminals of the users, such as control of game content (game items, game events, and the like) associated with the location. In addition, the game control unit 302 controls arrangement of content (controls rates of appearance) in the predetermined region in accordance with the feeling information of the users in the predetermined region.

(Communication Unit 31)

The communication unit 31 connects to the network 4 in a wired or wireless manner and transmits and receives data to and from an external device via the network 4. The communication unit 31 establishes communication connection with the network 4 through a wired/wireless local area network (LAN) or Wireless Fidelity (Wi-Fi) (registered trademark), for example.

In addition, the communication unit 31 according to the embodiment connects to the client terminals (the user terminal device 10a and the wearable device 10b) of the users and provides game screens, game sounds, and the like. In addition, the communication unit 31 can request the feeling management server 2 to send (real-time) feelings of persons who are present in the predetermined region and acquire the feelings.

(Storage Unit 32)

The storage unit 32 is realized by a ROM that stores programs, computation parameters, and the like that are used for processing performed by the control unit 30 and a RAM that temporarily stores parameters and the like that appropriately change. For example, the storage unit 32 according to the embodiment stores various parameters related to game content (for example, rates of appearance of the game content in the predetermined region), game user information, and the like.

The configuration of the game server 3 according to the embodiment has been specifically described above.

3. Examples

Next, the information processing system according to the embodiment will be specifically described using a plurality of examples.

3-1. First Example

First, a first example will be described with reference to FIGS. 5 and 6. In the first example, feelings of arbitrary users who are present in a predetermined region are estimated in real time, and control is performed to provide game content associated with the inside of the region such that conditions in the predetermined region become satisfactory. In the first example, target users whose feelings are to be estimated are not limited to game users who are playing a game and may be non-game users who are not playing the game.

Figure 5:
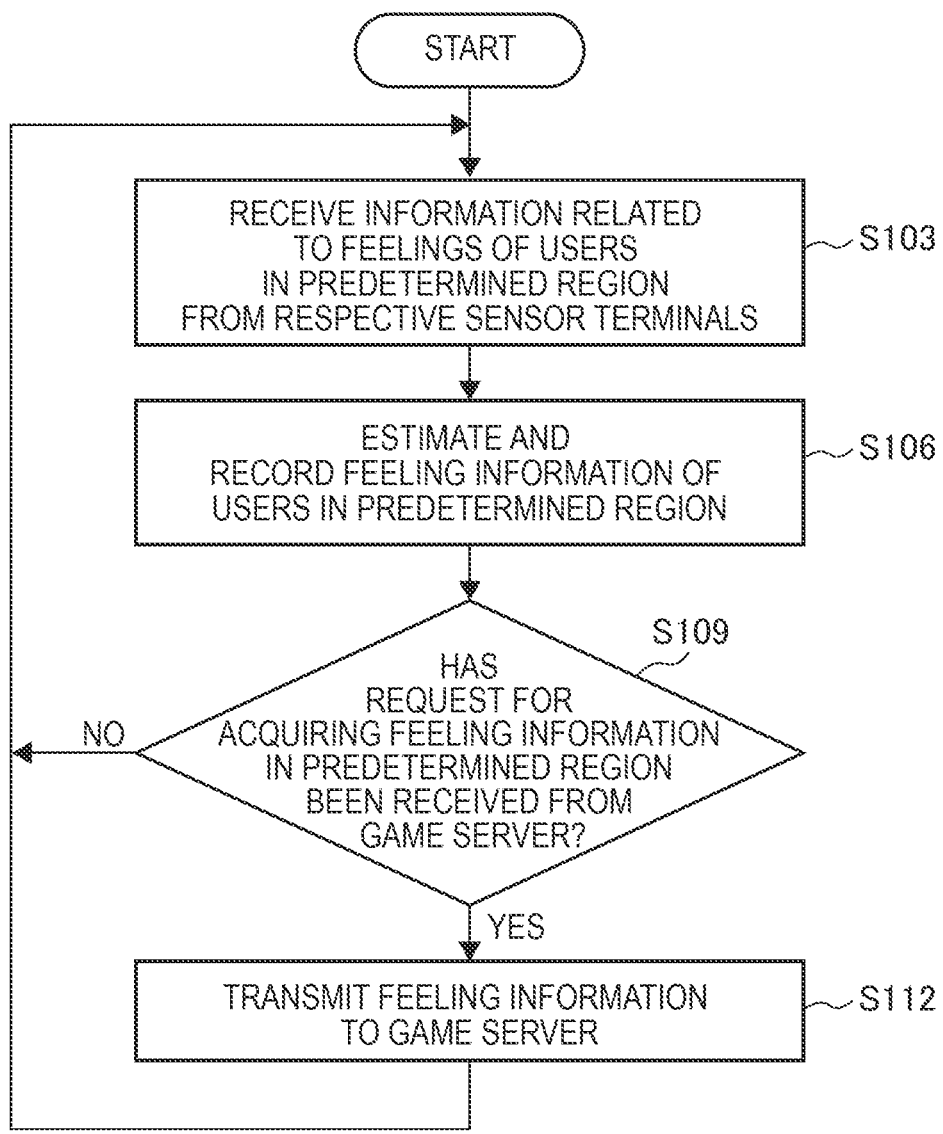
FIG. 5 is a flowchart illustrating operation processing of a feeling management server in a first example of the embodiment.

FIG. 5 is a flowchart illustrating operation processing of the feeling management server 2 in the first example. As illustrated in FIG. 5, the feeling management server 2 receives information related to feelings of users in a predetermined region from the respective sensor terminals first (Step S103). The feeling management server 2 may receive the feelings of the users along with positional information from the user terminal device 10a or the wearable device 10b or may receive sensing data from the camera 11a, the people stream sensor 11b, and the like that are installed in the predetermined region.

Next, the feeling management server 2 estimates feeling information of the users in the predetermined region by the feeling estimation unit 201 and records the feeling information in the storage unit 22 (Step S106). Specifically, the feeling estimation unit 201 estimates a degree of activity, a degree of happiness, a degree of excitement, or the like in the predetermined region on the basis of density of population (people stream, lengths of time people remain, how many people are present) in the predetermined region, a rate of smiling persons, a rate of persons who have positive feelings, or the like.

Then, the feeling management server 2 repeats the above Steps S103 to S106, and in a case in which a request for acquiring feeling information in the predetermined region has been received from the game server 3 (Step S109/Yes), the feeling management server 2 replies with the feeling information (real-time feeling information) in the predetermined region to the game server 3 in response to the request (Step S112). At this time, the feeling management server 2 may reply with the feeling information in the predetermined region in association with the positional information.

Next, operation processing on the side of the game server 3 that sends the acquisition request to the feeling management server 2 will be described with reference to FIG. 6. FIG. 6 is a flowchart illustrating operation processing of the game server 3 in the first example.

Figure 6:
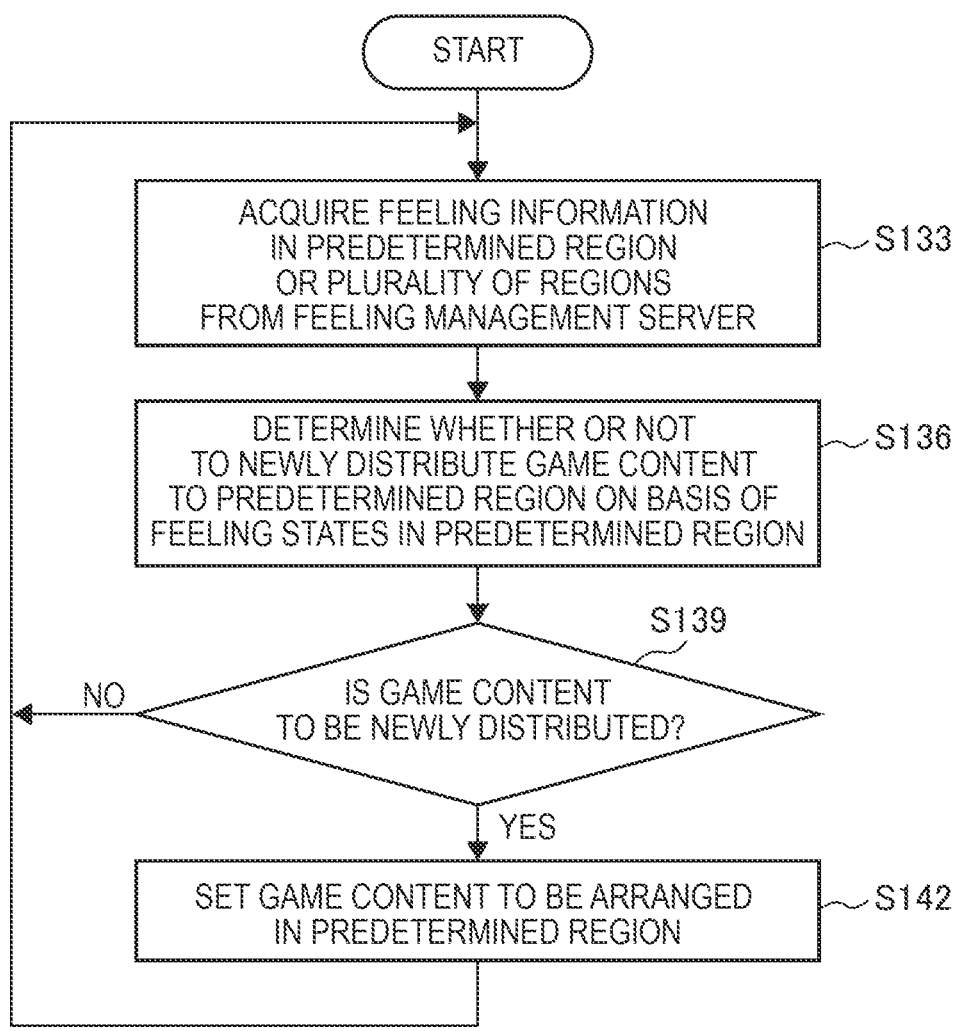
FIG. 6 is a flowchart illustrating operation processing of a game server in the first example of the embodiment.

As illustrated in FIG. 6, the game server 3 acquires feeling information in a requested predetermined region or a plurality of regions from the feeling management server 2 first (Step S133). The acquired feeling information may be feeling information associated with positional information of the client devices of the respective users. Also, when the game server 3 acquires the feeling information from the feeling management server 2, a proper right to access may be issued in advance to prevent the information from being improperly utilized. That is, the game server 3 can access the feeling management server 2 for acquiring the information after being authenticated in advance. A mechanism for such authentication may be prepared by the feeling management server 2, or an authentication mechanism may be separately provided. Also, in a case in which feeling information of an indefinite number of users in the predetermined region is acquired, feeling states are considered to be summarized from a macro-perspective (there are cases in which a degree of activity or a degree of excitement in the entire predetermined region is provided as the feeling information). Therefore, it is not necessary to focus on the privacy of the individual persons, and thus it is also possible to permit access to the information without acquisition of the right to access that is set strictly. For example, a simple scheme of exchanging an ID or a password issued in advance via an encrypted communication path is considered.

Next, the game control unit 302 of the game server 3 determines whether or not game content is to be newly distributed to the inside of the predetermined region in order to cause the predetermined region to be satisfactory on the basis of the feeling states in the predetermined region (Step S136). In a case in which the inside of the predetermined region is not active (the density of population is low, or the number of smiling persons is small), for example, new game content associated with the predetermined region is distributed to activate the predetermined region. Although the content of the game content depends on the game, examples thereof include game items and game events. It is necessary for the game users to actually visit the locations to acquire the game content (the game control unit 302 offers the game content to the users in accordance with current positional information of the users). Therefore, it is possible to raise the degree of activity at the location by allowing the game users to visit the location to get the game content.

Then, it is determined to newly distribute the game content to the inside of the predetermined region (Step S139/Yes), the game control unit 302 sets the game content to be arranged in the predetermined region (Step S142). More specifically, the game control unit 302 can substantially arrange the new game content in the predetermined region merely by changing a rate of appearance (game parameter) of the target game content in the predetermined region. In addition, the game control unit 302 may provide notification that the new game content has been arranged (alternatively, notification that the frequency of appearance has been changed) to the game user in the game application.

3-2. Second Example

Next, a second example will be described with reference to FIG. 7. In the second example, feelings of game users who are present in a predetermined region are estimated in real time, and game content is provided in association with the inside of the region such that conditions in the predetermined region become satisfactory. The second example is different from the first example in that target users whose feelings are to be estimated are limited game users who are playing the game.

Figure 7:
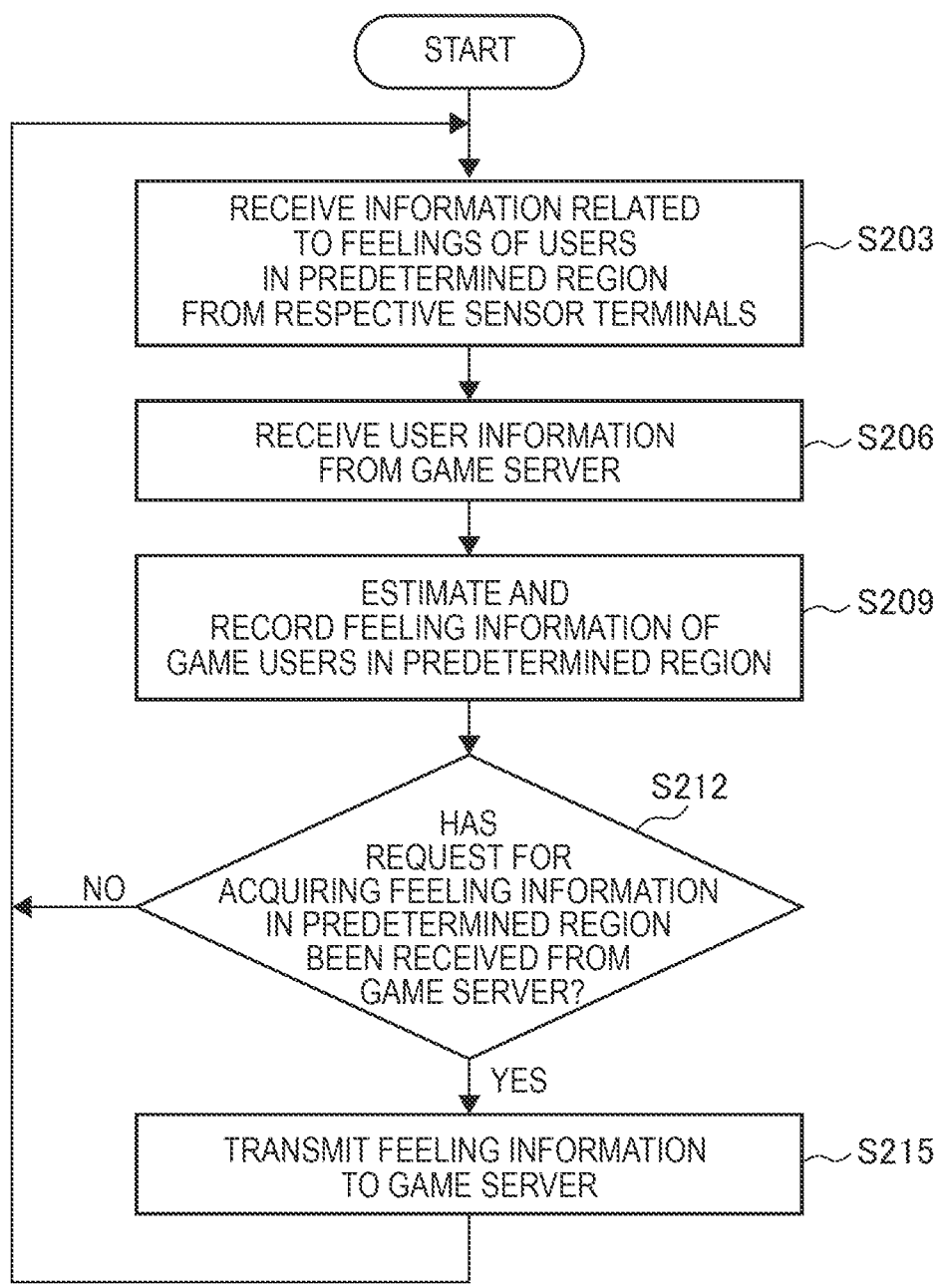
FIG. 7 is a flowchart illustrating operation processing of a feeling management server in a second example of the embodiment.

FIG. 7 is a flowchart illustrating operation processing of the feeling management server 2 in the second example. As illustrated in FIG. 7, the feeling management server 2 receives information related to feelings of users in a predetermined region from the respective sensor terminals (Step S203).

Next, the feeling management server 2 receives user information from the game server 3 (Step S206). The game server 3 can periodically transmit user information associated with IDs and current positional information of the game users. In a case in which the IDs of the game users are global identifiers, feeling states of the game users can be specified even inside the feeling management server 2 using the IDs. In addition, even in a case in which the IDs of the users are not global identifiers, it is possible to specify the users by associating the IDs of the game users and IDs of the users managed by the feeling management server 2 in advance.

Then, the feeling management server 2 estimates feeling information of the game users in the predetermined region by the feeling estimation unit 201 and records the feeling information in the storage unit 22 (Step S209). Here, although the "game users" basically indicate users who are performing the game (in real time), the embodiment is not limited thereto, and users who are not currently playing the game but has installed the game application on the client terminals of the users may also be included.

Next, the feeling management server 2 repeats the above Steps S203 to S209, and in a case in which a request for acquiring feeling information (of the game users) in the predetermined region is received from the game server 3 (Step S212/Yes), the feeling management server 2 replies the feeling information (real-time feeling information) in the predetermined region to the game server 3 in response to the request (Step S215).

In a case in which the feeling information replied to the game server 3 is feeling information of individual game users (a state in which the individuals can be specified), access control may be provided in consideration of privacy. It is assumed that the game server 3 acquires a right to access in a predetermined high level from the feeling management server 2 and requests for the feeling information. For example, a method of utilizing a certificate issued by a third party for authenticating whether or not the access from the game server 3 is valid is considered.

In addition, in a case in which the feeling information replied to the game server 3 is statistical data of feeling information of a plurality of game users in the predetermined region (an average degree of smiling persons, a degree of excitement, and the like) and is not specified as feeling information of the individual game users, the request for the right to access as described above may not be provided.

Since operation processing on the side of the game server 3 in the example is similar to that in the first example described with reference to FIG. 6, the detailed description will be omitted here.

That is, the game server 3 sends an acquisition request to the feeling management server 2, acquires feeling states of the game users in the predetermined region, and performs arrangement control of the game content in the predetermined region such that the feelings of the game users in the predetermined region become more satisfactory. In a case in which the feelings of the game users in the predetermined region are flat and are not excited, for example, it is possible to arrange new game content in the predetermined region (increase the game content, add special game content, change existing game content into special game content, or the like) to excite the game users.

In addition, in case in which game users who are staying in a predetermined region are not playing a game, it is possible to state that the game users are in a bored feeling state. Therefore, it is possible to expect an increase in an active rate by the game server 3 arranging special game content in the predetermined region and providing notification thereof to the users.

3-3. Third Example

Subsequently, a third example will be described with reference to FIGS. 8 and 9. In the third example, feelings of non-game users who are present in a predetermined region are estimated in real time, and control is performed to suppress distribution of game content to the predetermined region in which the non-game users feel uncomfortable (with the game users who have gathered at the location).

This is because a predetermined location at which an item or the like appears in a positional information game is a location used by many non-game users and there is a concern that the non-game users feel uncomfortable in a case in which excessively many game users have gathered and the location becomes crowded.

Figure 8:
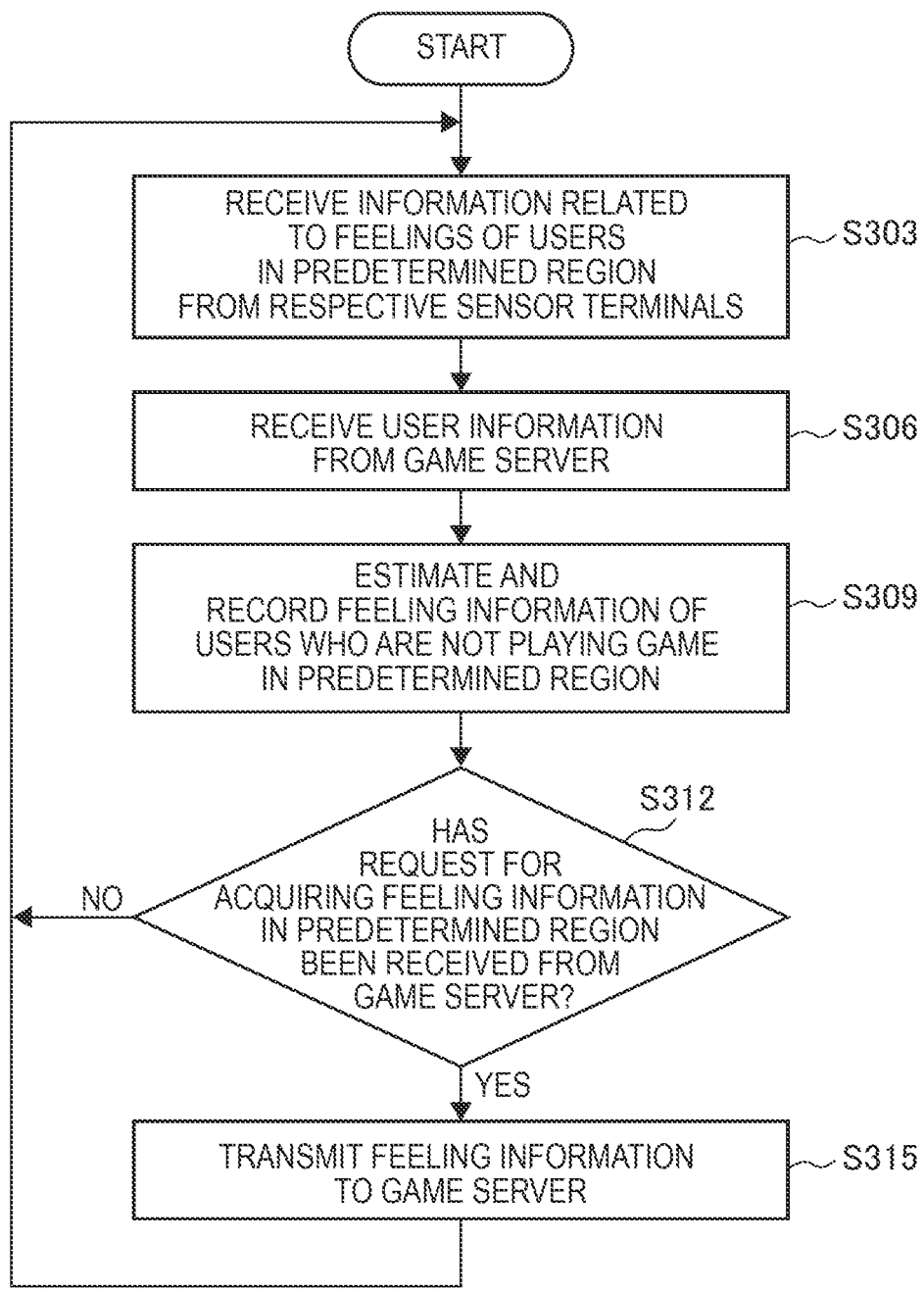
FIG. 8 is a flowchart illustrating operation processing of a feeling management server in a third example of the embodiment.

FIG. 8 is a flowchart illustrating operation processing of the feeling management server 2 in the third example. As illustrated in FIG. 8, the feeling management server 2 receives information related to feelings of users in a predetermined region from the respective sensor terminals first (Step S303).

Next, the feeling management server 2 receives user information from the game server 3 (Step S306).

Next, the feeling management server 2 estimates feeling information of the non-game users in the predetermined region by the feeling estimation unit 201 and records the feeling information in the storage unit 22 (Step S309). The non-game users to be specified are users specified by game user IDs included in the user information that is received in Step S306. In addition, the game users and the non-game users may not be strictly distinguished by the IDs. In a case in which only current positional information of the game users are transmitted from the game server 3, for example, the feeling estimation unit 201 may regard users who are staying near the game users as game users.

Subsequently, the feeling management server 2 repeats the above Steps S303 to S309, and in a case in which a request for acquiring feeling information of the non-game users in the predetermined region is received from the game server 3 (Step S312/Yes), the feeling management server 2 replies the feeling information (real-time feeling information) in the predetermined region to the game server 3 in response to the request (Step S315). The feeling estimation unit 201 may reply a statistical feeling state based on the feeling information of the entire non-game user in the predetermined region, instead of specific feelings of the individual persons, as the feeling information of the non-game user in the predetermined region. The feeling estimation unit 201 can also estimate the feeling information of the game users in the predetermined region and regard negative feelings of the non-game users in the predetermined region as being caused by the game users in consideration of the estimated feeling information. In a case in which about 100 game users in the predetermined region have fun feelings while about a half of about 1000 non-game users have uncomfortable feelings, for example, there is a possibility that the game user has some influences on the non-game users. In addition, in case in which the number of game users in the predetermined region is large, and not a small number of non-game users who have extremely uncomfortable feelings are present, there is a high possibility that the non-game users have the uncomfortable feeling due to the large number of game users.

Next, operation processing on the side of the game server 3 that has sent an acquisition request to the feeling management server 2 will be described with reference to FIG. 9. FIG. 9 is a flowchart illustrating operation processing of the game server 3 in the third example.

Figure 9:
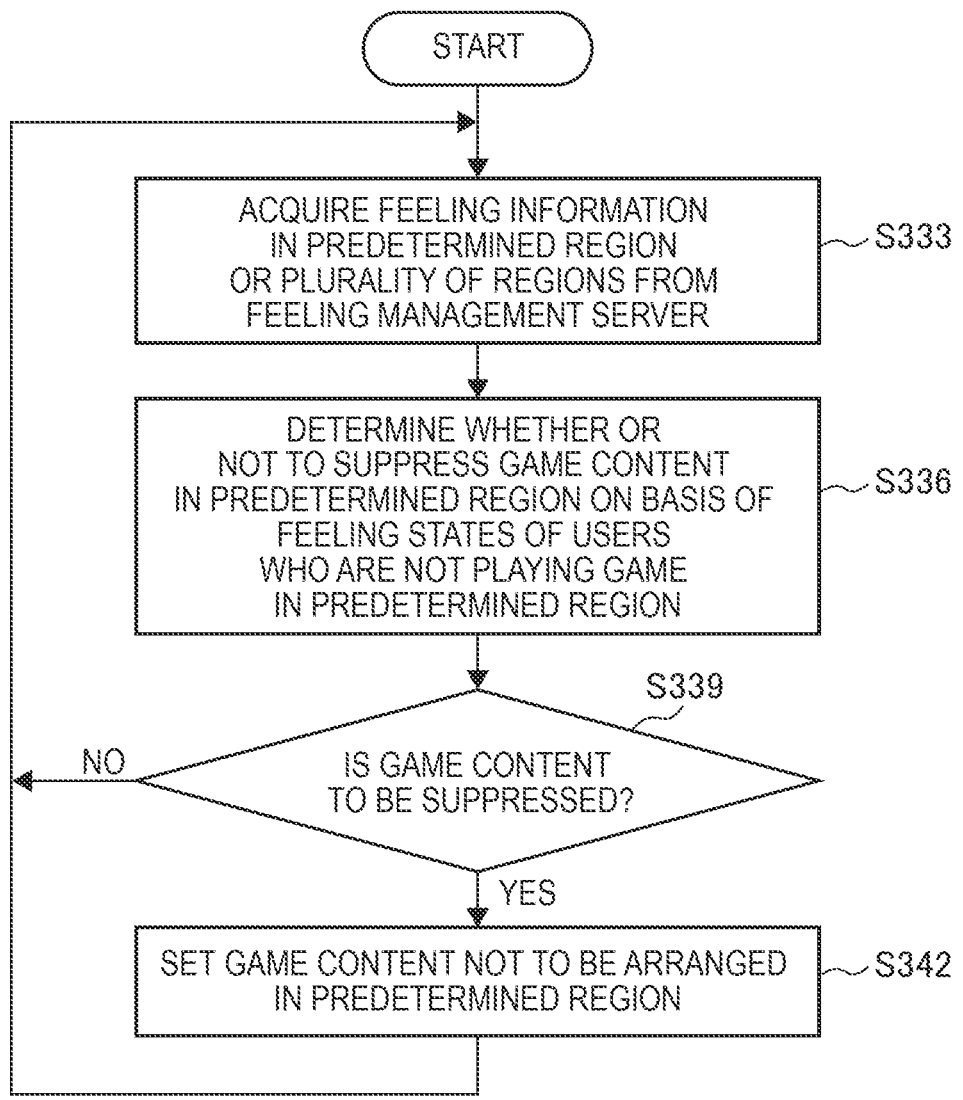
FIG. 9 is a flowchart illustrating operation processing of a game server in the third example of the embodiment.

As illustrated in FIG. 9, the game server 3 acquires feeling information in a requested predetermined region or a plurality of regions from the feeling management server 2 first (Step S333).

Next, the game control unit 302 of the game server 3 determines whether or not to suppress game content in the predetermined region on the basis of the feeling states of the users who are not playing the game (non-game users) in the predetermined region (Step S336). Specifically, in a case in which it is estimated that the feelings of the non-game users are uncomfortable feelings, for example, the game control unit 302 can move the game users to another region by deleting the game content from the predetermined region and controlling the game content not to appear in the future, thereby avoiding negative influences on the non-game users. In addition, although the uncomfortable feelings of the users who are not playing the game are regarded as being caused by the game users in the embodiment, the uncomfortable feelings may be compared with feeling information before the game content is arranged in the predetermined region, for example, in order to more accurately perform determination.

Then, in a case in which it is determined to that the game content is to be suppressed (Step S339/Yes), the game control unit 302 sets the game content not to be arranged in the predetermined region (Step S342). Specifically, the game control unit 302 can substantially delete the game content from the predetermined region merely by setting a rate of appearance (game parameter) of the target game content in the predetermined region to "0".

3-4. Fourth Example

Subsequently, a fourth example will be described with reference to FIG. 10. In the fourth example, it is possible to call more game users and to increase a possibility that a person in trouble is helped, by arranging special game content in the region in a case in which non-game users who are present in the predetermined region are in trouble.

Since operation processing of the feeling management server 2 in the fourth example is similar to that in the third example described above with reference to FIG. 8, detailed description will be omitted here. That is, the feeling management server 2 replies feeling information of the non-game users in the predetermined region to the game server 3 in response to an acquisition request from the game server 3.

Figure 10:
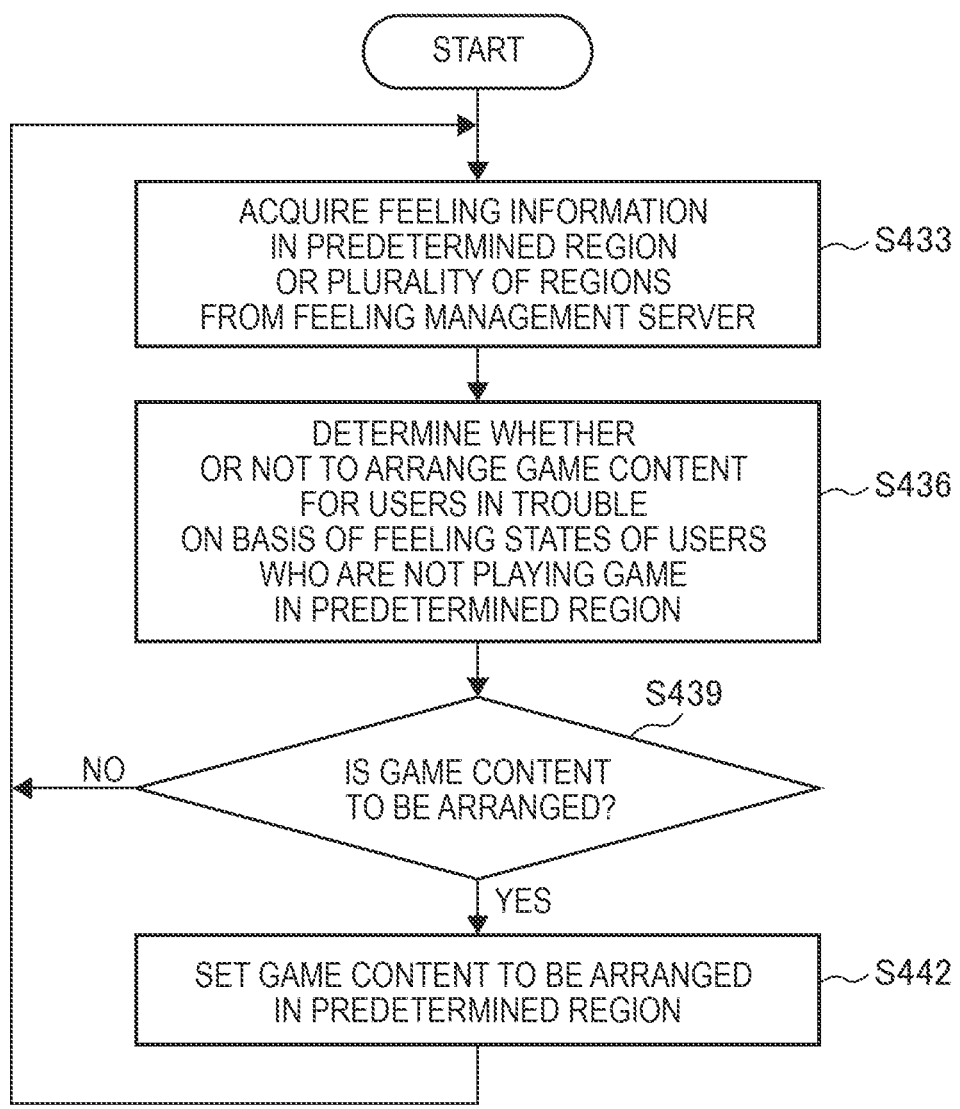
FIG. 10 is a flowchart illustrating operation processing of a game server in the fourth example of the embodiment.

FIG. 10 is a flowchart illustrating operation processing of the game server 3 in the fourth example. As illustrated in FIG. 10, the game server 3 acquires feeling information of a requested predetermined region or a plurality of regions from the feeling management server 2 first (Step S433).

Next, the game control unit 302 of the game server 3 determines whether or not to arrange game content for users in trouble on the basis of feeling states of users who are not playing the game in the predetermined region (Step S436).

Then, in a case in which it is determined that the game content is to be arranged (Step S439/Yes), the game control unit 302 sets the game content to be arranged in the predetermined region (Step S442). In addition, the game control unit 302 may arrange special content that is expected to have a higher ability of attracting customers than normal content, such as a rare character, in order to call more game users to the predetermined region.

In this manner, it is possible to call neighboring game users to a location where there is an old person who is in trouble due to a lot of luggage or a location where persons who are lost and in trouble tend to occur, such as a location where there are many travelers or a location where there are many popular shops and many people who visit there for the first time, and to increase opportunities to help the persons in trouble. In addition, the game control unit 302 may arrange content that calls game users who frequently visit the predetermined region with priority.

3-5. Fifth Example

Next, a fifth example will be described with reference to FIG. 11. In the fifth example, it is possible to secure safety of game users by estimate feelings of non-game users in a predetermined region and performing control to encourage the game users not to approach an area where many offended persons are present (an area with poor public security) or to encourage game users who have already stayed there to move to a neighboring region.

Since operation processing of the feeling management server 2 in the fifth example is similar to that in the third example described above with reference to FIG. 8, detailed description will be omitted here. That is, the feeling management server 2 replies feeling information of non-game users in the predetermined region to the game server 3 in response to an acquisition from the game server 3.

Figure 11:
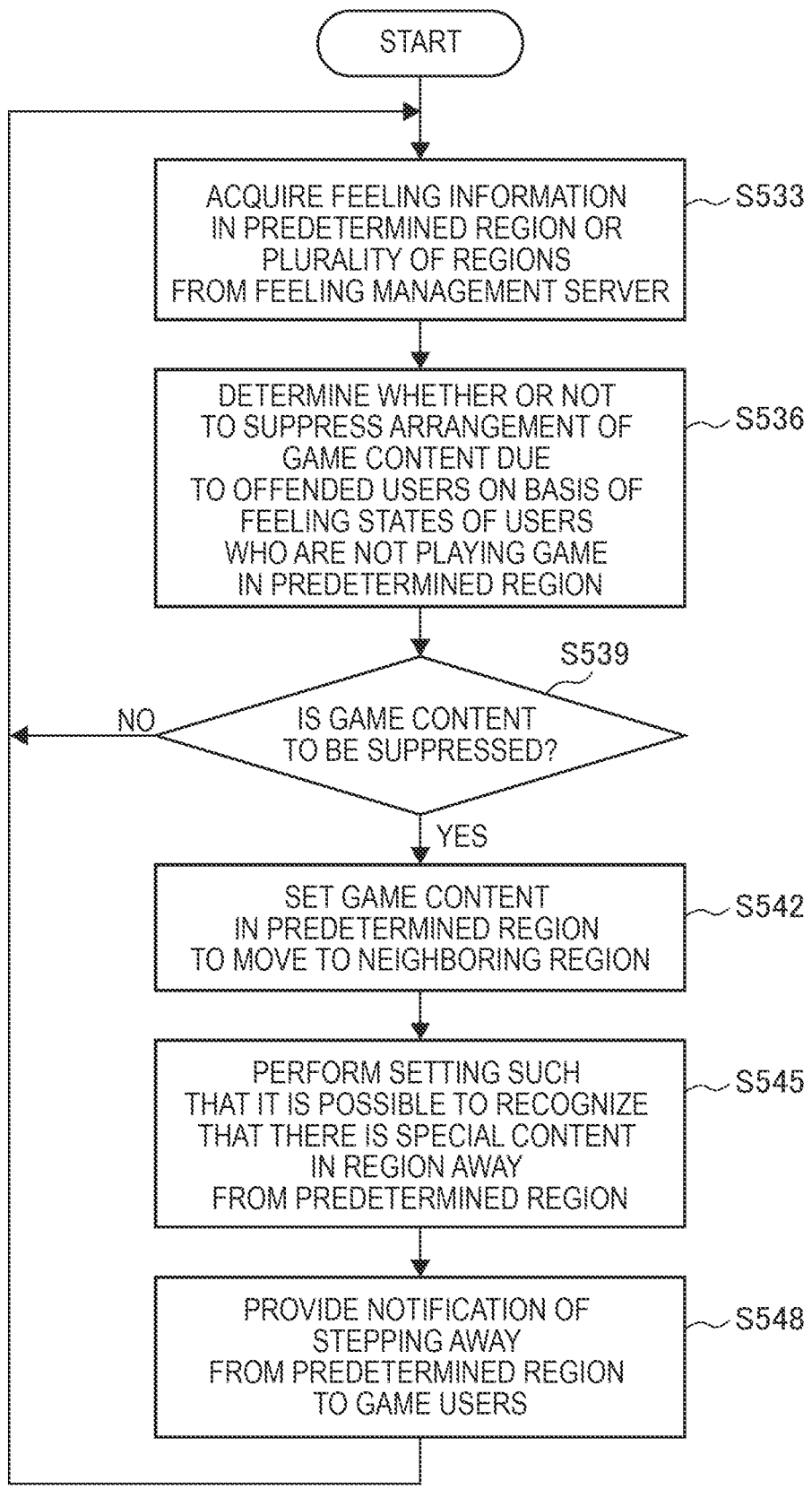
FIG. 11 is a flowchart illustrating operation processing of a game server in the fifth example of the embodiment.

FIG. 11 is a flowchart illustrating operation processing of the game server 3 in the fifth example. As illustrated in FIG.

11, the game server 3 acquires feeling information in a requested predetermined region or a plurality of regions from the feeling management server 2 first (Step S533).

Next, the game control unit 302 of the game server 3 determines whether or not to suppress (reduce) arrangement of game content due to presence of offended users (angry users, users with aggressive feelings, frustrated users, yelling users, and the like) on the basis of feeling states of users who are not playing the game in the predetermined region (Step S536). In addition, the game control unit 302 may determine that the arrangement of the game content is to be suppressed further in a case in which many users are frightened, regardless of the presence of the offended users in the predetermined region.

Then, it is determined that the game content is to be suppressed (Step S539/Yes), the game control unit 302 sets the game content in the predetermined region to move to a neighboring region (Step S542). In this manner, it is possible to move the users in the predetermined region to the neighboring region.

Next, the game control unit 302 performs setting such that it is possible to recognize that there is special content in a region away from the predetermined region (Step S545). In this manner, it is possible to prevent the game user from approaching the predetermined region.

Then, the game control unit 302 provides a notification of stepping away from the predetermined region (in a case in which the game users still remain in the predetermined region even after the control of suppressing the game content) (Step S548). A further instruction may be provided to the game users in the neighboring region in order to prevent the game users from approaching the predetermined region.

4. Conclusion

As described above, the information processing system according to the embodiment of the present disclosure can control content to be provided in association with a location in consideration of feelings of persons who are present at the location.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM, and a RAM incorporated in the aforementioned feeling management server 2 or the game server 3 to exhibit the functions of the feeling management server 2 or the game server 3. In addition, a computer-readable storage medium that stores the computer program is also provided.

In addition, although the game server 3 acquires the feeling information of the users in the predetermined region from the feeling management server 2 in the aforementioned embodiment, the embodiment is not limited thereto, and the game server 3 may receive information related to the feelings of the users in the predetermined region from the respective sensor terminals and perform feeling estimation.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system including:
a communication unit that receives at least information related to a feeling of a user who is present in a predetermined region; and
a control unit that controls content that is associated with the predetermined region and is to be provided to the user, on the basis of the feeling of the user who is present in the predetermined region, which is specified on the basis of the information received by the communication unit.

(2)
The information processing system according to (1),
in which the communication unit directly or indirectly receives, from a client device, the information related to a feeling of a user along with positional information indicating a position of the client device, and
the control unit controls the content that is associated with a predetermined region and is to be provided to the user, on the basis of the feeling of the user who is present in the predetermined region, which is specified by the positional information and the information related to the feeling of the users received by the communication unit.

(3)
The information processing system according to (1) or (2),
in which the communication unit directly or indirectly receives the information related to a feeling of a user from a sensor that senses user who is present in the predetermined region, and
the control unit controls the content that is associated with the predetermined region and is to be provided to the user, on the basis of the feeling of the user who is currently present in the predetermined region, which is specified on the basis of the information received by the communication unit.

(4)
The information processing system according to any one of (1) to (3), in which the control unit performs control to increase or decrease game content that is associated with the predetermined region and is to be provided to a user who is playing a game, on the basis of a feeling of the user who is present in the predetermined region.

(5)
The information processing system according to any one of (1) to (3), in which the control unit controls game content that is associated with the predetermined region and is to be provided to a user who is playing a game, on the basis of a feeling of the user who is present in the predetermined region and is playing the game.

(6)
The information processing system according to (5), in which the control unit performs control to increase the game content that is associated with the predetermined region in a case in which a feeling of the user who is playing the game is negative.

(7)
The information processing system according to any one of (1) to (5), in which the control unit performs control to change game content that is associated with the predetermined region and is to be provided to a user who is playing a game to special content when it is estimated that the user who is present in the predetermined region and is playing the game has a feeling of boredom.

(8)
The information processing system according to any one of (1) to (7), in which the control unit controls game content that is associated with the predetermined region and is to be provided to a user who is playing a game, on the basis of a feeling of user who is present in the predetermined region but is not playing the game.

(9)
The information processing system according to (8), in which the control unit performs control to decrease game content that is associated with the predetermined region and is to be provided to a user who is paying a game if it is determined that a user who is present in the predetermined region but is not playing a game feel uncomfortable.

(10)
The information processing system according to any one of (1) to (9), in which the control unit performs control to associate rare content that is expected to have a higher ability of attracting customers than normal content with the predetermined region if it is determined that a user who is present in the predetermined region but is not playing a game is in trouble.

(11)
The information processing system according to any one of (1) to (10), in which the control unit performs control to decrease game content that is associated with the predetermined region and is to be provided to a user who is playing a game if it is determined that a user who is present in the predetermined region but is not playing a game is offended.

(12)
The information processing system according to (11), in which the control unit performs control to associate game content that is associated with the predetermined region and is to be provided to a user who is playing a game with a region that is positioned in vicinity of the predetermined region.

(13)
The information processing system according to (11) or (12),
in which the control unit controls the communication unit to provide a notification of stepping away from the predetermined region to a client device of a user when the user who is playing a game is present in the predetermined region.

(14)
An information processing system including:
a communication unit that receives at least information related to feelings of users who are present in a predetermined region;
a storage unit that accumulates the feelings of the users in units of the users; and
a control unit that performs control to extract the feelings of the users who are present in the predetermined region from the storage unit and send a reply to a content providing server via the communication unit when request information of requesting the feelings of the users who are present in the predetermined region from the content providing server is received via the communication unit,
in which the content providing server controls content that is associated with the predetermined region and is to be provided to the users, on the basis of the feelings of the users who are present in the predetermined region.

(15)
An information processing method including, by a processor:
receiving, by a communication unit, at least information related to a feeling of a user who is present in a predetermined region from a communication unit; and
controlling content that is associated with the predetermined region and is to be provided to the user, on the basis of the feeling of the user who is present in the predetermined region, which is specified on the basis of the information received by the communication unit.

(16)
An information processing method including, by a processor:
receiving. by a communication unit, at least information related to feelings of users who are present in a predetermined region;
accumulating, in a storage unit, the feelings of the users in units of the users; and
performing control to extract the feelings of the users who are present in the predetermined region from the storage unit and send a reply to a content providing server via the communication unit when request information of requesting the feelings of the users who are present in the predetermined region from the content providing server is received via the communication unit,
in which the content providing server controls content that is associated with the predetermined region and is to be provided to the users, on the basis of the feelings of the users who are present in the predetermined region.

REFERENCE SIGNS LIST 2 feeling management server
20 control unit
201 feeling estimation unit
21 communication unit
22 storage unit
3 game server
30 control unit
31 communication unit
32 storage unit
301 user information management unit
302 game control unit
4 network
10a user terminal device
10b wearable device
11a camera
11b people stream sensor

The invention claimed is:
1. An information processing apparatus, comprising:
communication circuitry configured to communicate with a plurality of user terminals; and
processing circuitry configured to:
control a game space of a positional information game, the user terminals executing the positional information game to access the game space based on locations of the user terminals in a real space;
obtain information of regions in the real space, using at least one of a terminal device, a wearable device, a camera, or a people stream sensor, the regions including at least a first region and a second region neighboring the first region, the obtained information including information of a non-game user, who is not interacting with the game, present in the first region, based on at least one of acceleration sensor data, gyro sensor data, geomagnetic sensor data, posi- tional information, vibration sensor data, biological information, a density of population, sound data, or face images, wherein at least one of the acceleration sensor data, the gyro sensor data, the geomagnetic sensor data, the positional information, the vibration sensor data, or the biological information is receivable from either of the terminal device or the wearable device, wherein at least one of the density of population, the sound data, or the face images is receivable from either of the camera or the people stream sensor, wherein the biological information includes pulses, heart rates, amounts of sweating, aspiration, body temperatures, myoelectric values, and brain waves, wherein the density of population includes a people stream, a number of people, and lengths of time the people remain in the first region, and wherein the sound data includes environment sounds and utterance sounds;

determine whether the first region is unsafe for game users of the user terminals based on whether the obtained information is more than a threshold value; and responsive to the determination, change a frequency of appearance of a game content accessible at a virtual location in the game space that is associated with the second region.

2. The information processing apparatus according to claim 1,
wherein the game content is categorized as a rare content or a special content in the positional information game.

3. The information processing apparatus according to claim 1, wherein the processing circuitry is further configured to:
move placement of the game content previously accessible at another virtual location in the game space that is associated with the first region to become accessible at the virtual location in the game space that is associated with the second region.

4. The information processing apparatus according to claim 1, wherein the obtained information is more than the threshold value when a number of offended non-game users is higher than a predetermined value, and
the offended non-game users include angry users, users with aggressive feelings, frustrated users, and yelling users.

5. The information processing apparatus according to claim 2,
wherein the processing circuitry is configured to change the frequency of appearance of the game content by increasing a number of the game content.

6. The information processing apparatus according to claim 2,
wherein the processing circuitry is configured to change the frequency of appearance of the game content by adding the special content.

7. The information processing apparatus according to claim 2,
wherein the processing circuitry is configured to change the frequency of appearance of the game content by replacing the game content with the special content.

8. The information processing apparatus according to claim 1, wherein the obtained information is more than the threshold value when the density of population is lower than a predetermined value.

9. The information processing apparatus according to claim 1, wherein the processing circuitry is further configured to notify the game users of presence of the game content in the virtual location in the game space that is associated with the second region.

10. An information processing method, comprising:
controlling, by processing circuitry of an information processing apparatus, a game space of a positional information game, a plurality of user terminals executing the positional information game to access the game space based on locations of the user terminals in a real space;

obtaining, by the processing circuitry via communication circuitry of the information processing apparatus, information of regions in the real space, using at least one of a terminal device, a wearable device, a camera, or a people stream sensor, the regions including at least a first region and a second region neighboring the first region, the obtained information including information of a non-game user, who is not interacting with the game, present in the first region, based on at least one of acceleration sensor data, gyro sensor data, geomagnetic sensor data, positional information, vibration sensor data, biological information, a density of population, sound data, face images, wherein at least one of the acceleration sensor data, the gyro sensor data, the geomagnetic sensor data, the positional information, the vibration sensor data, or the biological information is receivable from either of the terminal device or the wearable device, wherein at least one of the density of population, the sound data, or the face images is receivable from either of the camera or the people stream sensor, wherein the biological information includes pulse, heart rates, amounts of sweating, aspiration, body temperatures, myoelectric values, and brain waves, wherein the density of population includes a people stream, a number of people, and lengths of time the people remain in the first region, and wherein the sound data includes environment sounds and utterance sounds:

determining whether the first region is unsafe for game users of the user terminals based on whether the obtained information is more than a threshold value; and responsive to the determination, changing a frequency appearance of a game content accessible at a virtual location in the game space that is associated with the second region.

11. The information processing method according to claim 10,
where the game content is categorized as a rare content or a special content in the positional information game.

12. The information processing method according to claim 10, further comprising moving placement of the game content previously accessible at another virtual location in the game space that is associated with the first region to become accessible at the virtual location in the game space that is associated with the second region.

13. The information processing method according to claim 10, wherein the obtained information is more than the threshold value when a number of offended non-game users is higher than a predetermined value, and
the offended non-game users include angry users, users with aggressive feelings, frustrated users, and yelling users.

14. The information processing method according to claim 10, wherein the obtained information is more than the threshold value when the density of population is lower than a predetermined value.

15. The information processing method according to claim 10, further comprising notifying the game users of presence of the game content in the virtual location in the game space that is associated with the second region.

* * * * *